US008081680B2

(12) United States Patent
Xu et al.

(10) Patent No.: US 8,081,680 B2
(45) Date of Patent: Dec. 20, 2011

(54) SELECTIVE INTER-LAYER PREDICTION IN LAYERED VIDEO CODING

(75) Inventors: Ji-Zheng Xu, Beijing (CN); Kai Zhang, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1422 days.

(21) Appl. No.: 11/564,088

(22) Filed: Nov. 28, 2006

(65) Prior Publication Data

US 2008/0123742 A1    May 29, 2008

(51) Int. Cl.
*H04N 7/46*    (2006.01)
*H04N 7/34*    (2006.01)
*H04N 7/36*    (2006.01)
*H04N 7/48*    (2006.01)
*H04N 7/32*    (2006.01)

(52) U.S. Cl. .............................. 375/240.11; 375/240.21

(58) Field of Classification Search .................. 375/240, 375/240.11, 240.21
See application file for complete search history.

(56) References Cited

U.S. PATENT DOCUMENTS

| 2003/0128754 A1* | 7/2003 | Akimoto et al. | 375/240.02 |
| 2006/0222079 A1* | 10/2006 | Park et al. | 375/240.16 |
| 2006/0233246 A1* | 10/2006 | Park et al. | 375/240.12 |
| 2007/0086520 A1* | 4/2007 | Kim | 375/240.1 |

OTHER PUBLICATIONS

S. Han & B. Girod, "Robust and Efficient Scalable Video Coding with Leaky Prediction", 2 Proc. of 2002 Int'l Conf. on Image Processing 41-44 (Dec. 10, 2002).*
Y. He, X. Zhao, Y. Zhong, & S. Yang, "Improved Fine Granular Scalable Coding with Inter-Layer Prediction", Proc. of 2002 Data Compression Conf. 172-181 (Aug. 7, 2002).*
T. Shanableh, P. Hobson, G. Reid & J. Teh, Amending the Syntax of the MPEG-4 Simple Scalable Profile to use Error Resilience Tools, Proc. of 2003 Int'l Conf. on Visual Info. Engineering 1-4 (Jul. 9, 2003).*
F. Wu, S. Li, & Y.Q. Zhang, "A Framework for Efficient Progressive Fine Granularity Scalable Video Coding", 11 IEEE Trans. on Circuits & Sys. For Video Tech. 332-344 (Mar. 2001).*

* cited by examiner

*Primary Examiner* — David Czekaj
*Assistant Examiner* — David N Werner
(74) *Attorney, Agent, or Firm* — Lee & Hayes, PLLC

(57) ABSTRACT

Systems and methods for using selective inter-layer prediction during layered video coding operations are described. In one aspect, a layered coded video structure is generated by selectively employing only objectively efficient inter-layer predictions between respective frames. Responsive to receiving a request for coded video data, one or more layers of the layered coded video structure are communicated to an application for decoding and presentation of video data to a user.

18 Claims, 4 Drawing Sheets

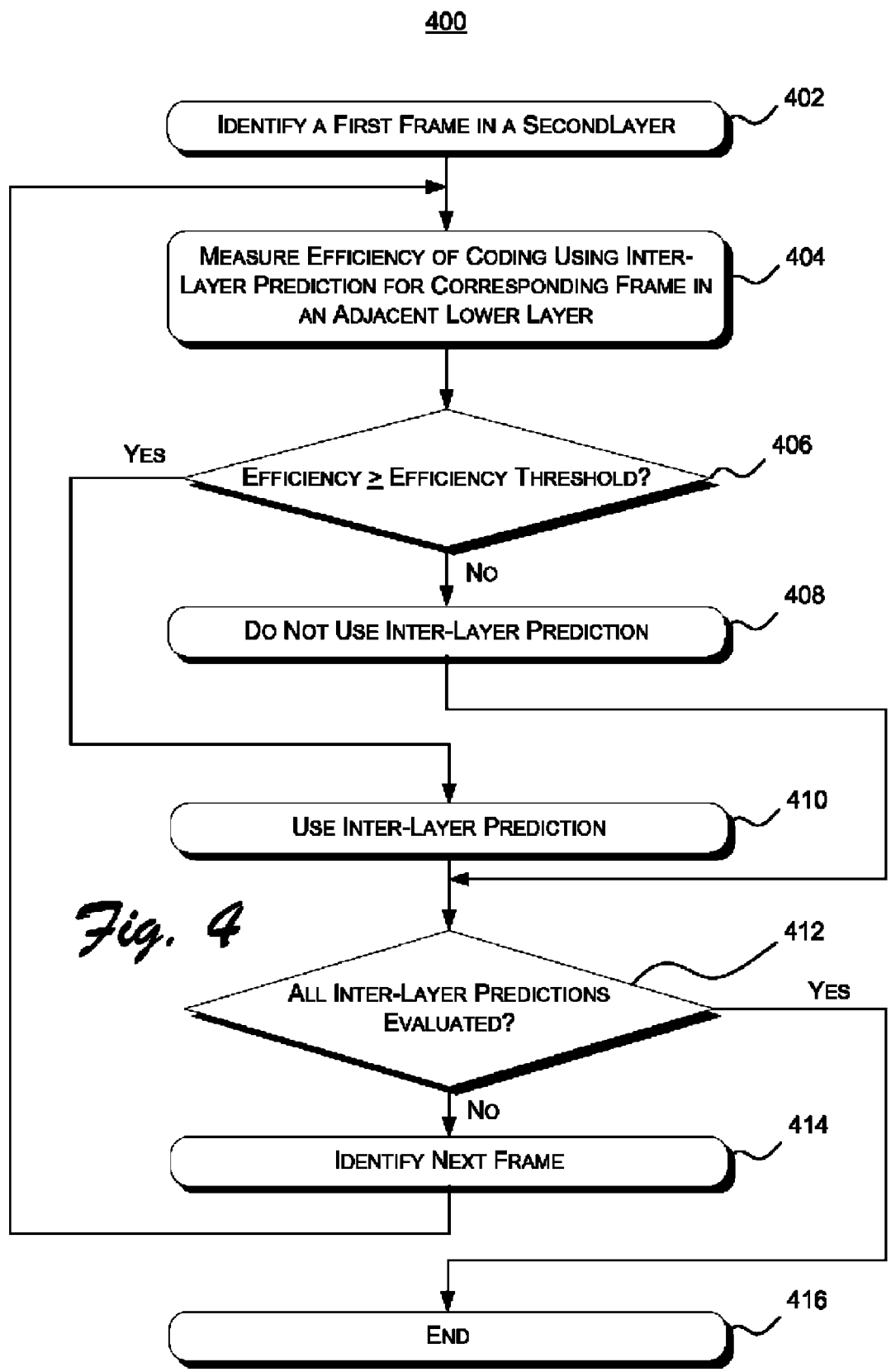

SELECTIVE INTER-LAYER PREDICTION IN LAYERED VIDEO CODING

BACKGROUND

Layered video coding is common in video coding standards such as MPEG-2, MPEG-4, H.263, scalable extension of MPEG-4 AVC, etc. By coding an input video sequence into different layers, layered video coding provides decoding applications and devices with direct access to different coded versions of the input video. FIG. 1 shows an exemplary layered coded video bitstream structure, wherein an original video data sequence has been coded into multiple different layers. In this example, the video has been coded into two layers. Each layer is coded to represent different respective qualities or resolutions as compared to the other layers in the structure. For example, and referring to FIG. 1(a), layer 0 represents a coded low resolution version of video data, and layer 1 represents a coded high resolution version of the same video data. In this scenario, when a decoding application desires to use a low resolution version of the video, the application accesses the bitstream of layer 0. Analogously, when the application desires to utilize a high resolution coded version of the video, the application accesses the layer 1 bitstream. In this manner, a decoding application can rely on characteristics of the layered video coded structure of FIG. 1(a) to obtain one or more coded versions of a same video sequence.

Based on layer-to-layer relationships in a layered coded video structure, the encapsulated layers are either independent of other layers in the structure (representing a "simulcast" structure) or dependent on other layers in the structure. That is, all of the layers in a structure either do not rely on inter-layer prediction, or all of the layers user inter-layer prediction. The simulcast scheme can optimize each layer's performance since each layer is independent. However, when all layers are required by a requesting application, the simulcast scheme is not efficient. This is because each layer respectively represents a same set of video signals, resulting in significant amounts of data redundancy across the various layers. On the other hand, layered video coding with inter-layer prediction can leverage inter-layer correlations across image frames to improve coding performance.

For purposes of exemplary illustration, FIG. 1(a) represents a layered coded video structure comprising layers that utilize inter-layer prediction, and FIG. 1(b) represents a simulcast-based layered coded video structure. Referring to FIG. 1(a)), the arrow from layer 0 to layer 1 indicates that the coding of layer 1 uses layer 0 as prediction. Correspondingly, layer 1 can be coded more efficiently as compared to a similarly situated layer that is based on the simulcast layered video coding scheme. However, a disadvantage of layered video coding with inter-layer prediction is that the low layer bitstream should always be sent to the decoder, even when the decoder only needs to generate the high layer video. So when all layers are required, inter-layer prediction provides superior coding performance. In contrast, when only one layer is required, the simulcast scheme provides better performance.

SUMMARY

Systems and methods for using selective inter-layer prediction during layered video coding operations are described. In one aspect, a layered coded video structure is generated by selectively employing only objectively efficient inter-layer predictions between respective frames. Responsive to receiving a request for coded video data, one or more layers of the layered coded video structure are communicated to an application for decoding and presentation of video data to a user. This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1(a) represents an exemplary layered structure utilizing inter-layer prediction. FIG. 1(b) represents an exemplary layered structure that does not utilize inter-layer protection (i.e., a simulcast structure).

FIG. 4 shows an exemplary procedure for implementing selective inter-layer prediction operations during layered video coding of an input video data sequence, according to one embodiment.

DETAILED DESCRIPTION

Overview

Systems and methods for selective inter-layer prediction during layered video coding operations are described. The systems and methods generate a hybrid layered video coded structure that represents a tradeoff between use of full inter-layer prediction between frame layers, and a simulcast structure wherein no inter-layer protection is used. To this end, and for each frame in an input video data sequence, the systems and methods measure respective frame-to-frame efficiencies of corresponding inter-layer predictions to determine whether to use respective ones of the inter-layer predictions when generating the hybrid structure. If a particular frame-to-frame inter-layer prediction is determined to be inefficient, the frames are not coded using the prediction. Whereas, if the particular inter-layer prediction is determined to be efficient, the frames are coded using the prediction. The result is a hybrid layered video coded structure, wherein objectively inefficient inter-layer predictions are not represented.

When a video decoder requests coded video data associated with a particular bit rate and does not request all layers, if inter-layer predictions between frames in the corresponding layer and frames in another layer were determined to be inefficient (and therefore, not present), the systems and methods communicate only that corresponding independent layer (a simulcast layer) to the decoder for decoding and presentation of resulting video to a user. Conversely, if the inter-layer layer predictions of that layer were determined to be efficient (and therefore used in the coding process), all layers in the structure are communicated to the decoder. Thus, and contrary to conventional layered video coding techniques and structures, the systems and methods generate a single hybrid layered video structure from which an application (e.g., a video streaming application, or other application.) can selectively provide a requesting decoder with a single simulcast layer and/or inter-layer prediction based layers, wherein inefficient ones of predictions are not represented.

These and other aspects of the systems and methods for selective inter-layer prediction in layered video coding are now described in greater detail.

An Exemplary System

Although not required, systems and methods for selective inter-layer prediction in layered video coding are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 2:
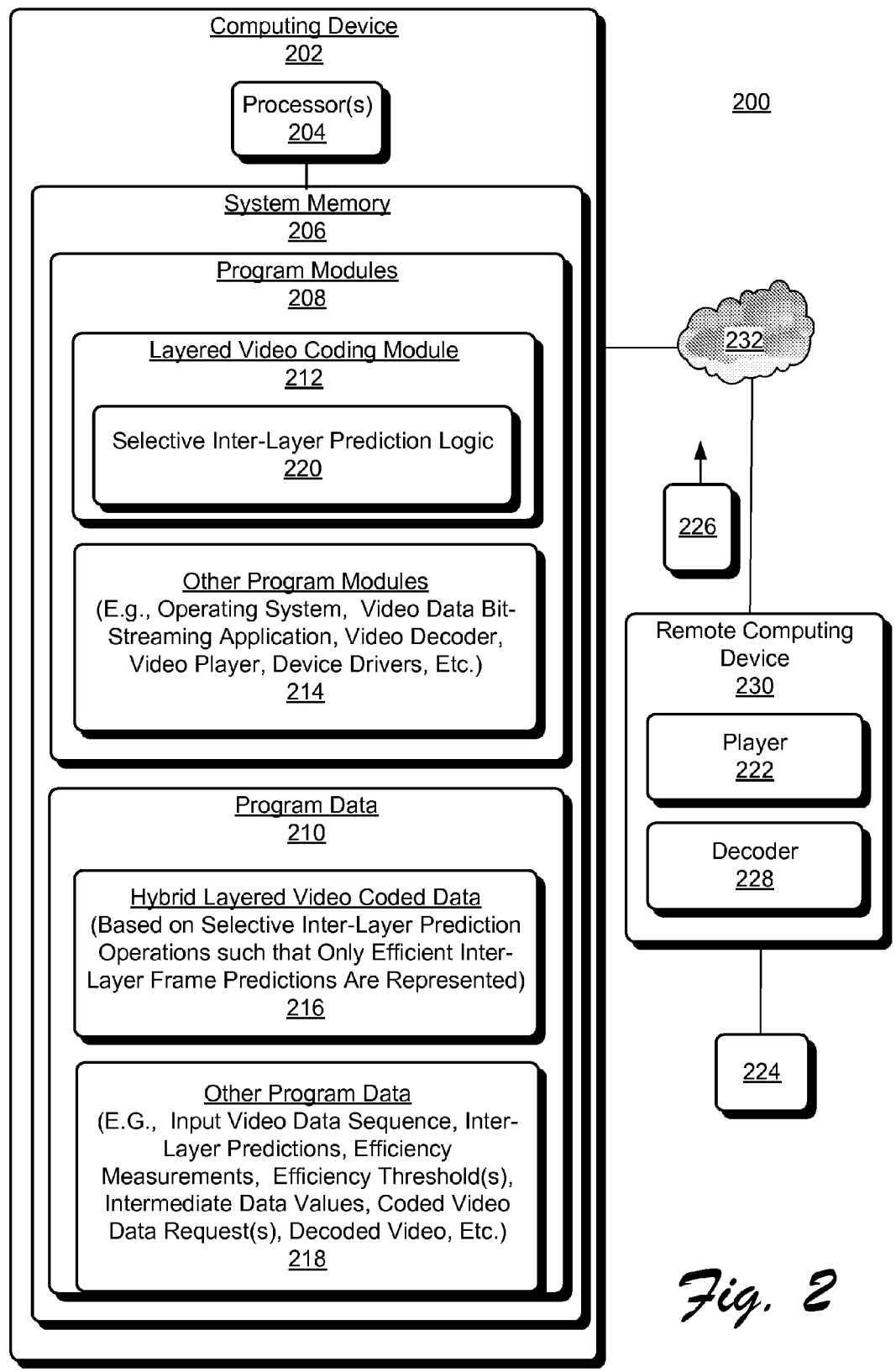
FIG. 2 shows an exemplary system that implements selective inter-layer prediction during layered video coding operations, according to one embodiment.

FIG. 2 shows an exemplary system 200 for selective inter-layer prediction in layered video coding, according to one embodiment. System 200 includes a computing device 202, for example a general purpose computing device, a server, a laptop, a mobile computing device, and/or so on. Computing device 202 includes one or more processors 204 coupled to a tangible computer-readable storage medium (e.g., system memory 206). Processor 204 may be a microprocessor, microcomputer, microcontroller, digital signal processor, etc. System memory 206 includes, for example, volatile random access memory (e.g., RAM) and non-volatile read-only memory (e.g., ROM, flash memory, etc.). System memory 206 comprises computer-program instructions executable by processor 204, and program data that is generated and/or used by respective ones of the computer-program instructions. Such computer-program instructions and program data are respectively shown as program modules 208 and program data 210. In this implementation, program modules 208 include, for example, layered video coding module 212 and "other program modules" 214 such as an Operating System (OS) to provide a runtime environment, and other applications such as a decoder to decode encoded data generated by layered video coding module 212, a video player to present decoded video data to a user, device drivers, etc.

Figure 1:
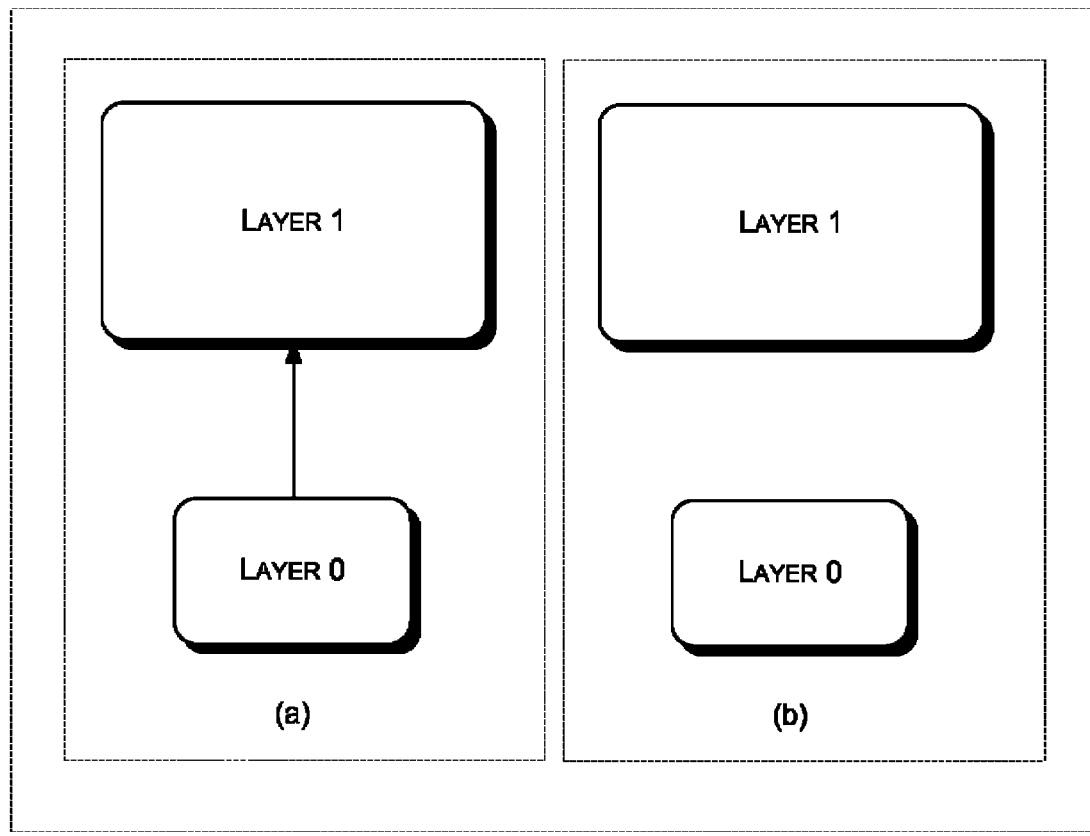
FIG. 1 shows two exemplary layered video bitstream structures respectively representing an original video data sequence that has been coded into multiple different layers using conventional layered video coding operations (i.e., not coded using selective inter-layer prediction coding). Specifically.

Layered video coding module 212 ("coding module 212"), codes frames of an input video data sequence using layered video coding operations to generate "hybrid layered video coded data" 216 ("hybrid structure" 216). For purposes of exemplary illustration, such an input video data sequence is shown as a respective portion of "other program data" 218. Hybrid layered video coded data 216, which is hereinafter often referred to as "hybrid structure 216", represents a tradeoff between use of full inter-layer prediction between frame layers (described above with respect to FIG. 1(a)), and a simulcast structure (described above with respect to FIG. 1(b)) wherein no inter-layer protection is used. To this end, and for each frame in an input video data sequence, coding module 212 implements selective inter-layer prediction logic 220 ("prediction logic 220") to calculate inter-layer predictions between the frames. For purposes of exemplary illustration, such inter-layer predictions are shown as respective portion of "other program data" 218.

Prediction logic 220, for each inter-layer prediction, objectively measures the efficiency of the prediction to determine whether to use the prediction between the corresponding inter-layer frames when generating hybrid structure 216. Specifically, if a particular frame-to-frame inter-layer prediction is determined to be inefficient, coding module 212 and does not coded the corresponding frames using the prediction. However, if the particular inter-layer prediction is efficient, the frames are coded with the prediction. The result is a hybrid layered video coded structure, wherein inefficient inter-layer predictions are not represented. In one implementation, each frame in a layer of hybrid structure 216 has been coded at a different bit rate and/or resolution. The particular bit rates and/or resolutions used to code respective ones of the frames are arbitrary, being a function of the particular implementation of coding module 212.

In view of the above, if hybrid structure 216 encapsulates any inter-layer frame predictions, the encapsulated inter-layer frame predictions will only be those predictions determined to be objectively efficient. In view of this objective prediction measurement criteria (described in greater detail below in the section titled "Evaluating Efficiency of Inter-Layer Predictions"), hybrid structure 216 can represent any of three possible structures based on the particular and arbitrary input video data sequence been coded. For example, in one implementation, all layers of hybrid structure 216 have corresponding inter-layer frame predictions; again, only the efficient predictions are represented in the structure. That is, no layers of hybrid structure 216 are independent (simulcast) layers. In another implementation, hybrid structure 216 represents a combination of one or more simulcast layers and non-simulcast layers (i.e., two or more layers with inter-layer frame predictions determined to be objectively efficient). In yet another implementation, hybrid structure 216 represents only simulcast layers because all measured inter-layer frame predictions were determined by prediction logic 220 to be inefficient. Thus, and contrary to conventional layered video coding techniques and structures, layered video coding module 212 generate a single hybrid layered video structure 216 from which an application (e.g., a video streaming application, or other application.) can selectively provide a requesting decoder with a single simulcast layer and/or inter-layer prediction based layers, wherein inefficient ones of predictions are not represented.

For example, responsive to receiving a request from a video decoder application for video data encoded at a particular bit rate, a video bit streaming application of system 200 communicates one or more corresponding portions of hybrid structure 216 to the requesting application. Exactly what gets communicated to the requesting application is based on one or more of whether the application specifically requests all layers, and/or whether the layers are coded with corresponding inter-layer frame predictions. For example, if a requesting application requests all layers, a bit streaming application communicates all layers of hybrid structure 216 to the requesting decoder for decoding and presentation (e.g., by a player 222 on a display device 224) of resulting decoded video to a user. Although the communicated layers may include one or more inter-layer frame predictions, objectively inefficient inter-layer predictions were not coded by prediction logic 220 into these layers. Analogously, if during coding operations prediction logic 220 determined that all of the inter-layer frame predictions were inefficient, the communicated layers are independent and that they are simulcast layers. In another scenario, if the requesting application does not request all layers of hybrid structure 216, and the layer representing the requested resolution/bit rate is not based on inter-layer frame predictions (i.e., the predictions were determined to be inefficient), the bit streaming application communicates only that layer (i.e., a simulcast layer) to the application.

For purposes of exemplary illustration, such a video bit streaming application is shown as respective portion of "other program modules" 214, although such a bit streaming application could reside on a computing device independent of a computing device that generated hybrid structure 216. In one implementation, a request 226 for one or more layers of hybrid structure 216 is received from a decoding application ("decoder") 228 implemented on a remote computing device 230 coupled to computing device 202 over network 232. In another implementation, a local decoding application (e.g., executing on computing device 202; please see "other program data" 214) initiates the request to the video bitstream application.

Evaluating Efficiency of Inter-Layer Predictions

Figure 3:
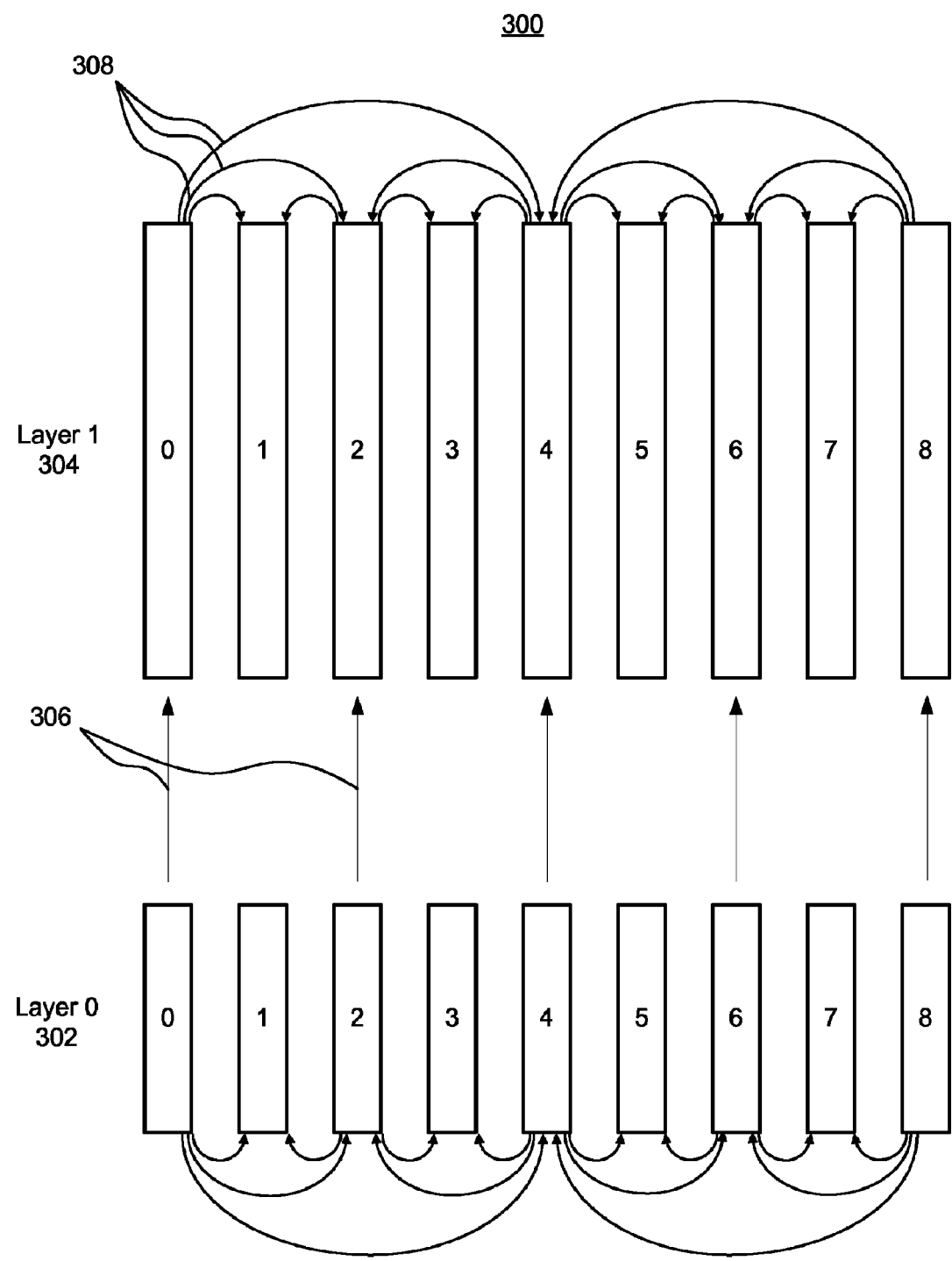
FIG. 3 shows an exemplary illustration of a hierarchical-B layered video coding structure that has been coded using selective inter-layer prediction operations, according to one embodiment.

FIG. 3 shows an exemplary set of frames in two layers of a hierarchical-B layered video coded structure 300, according to one embodiment. Structure 300 represents one exemplary implementation of a hybrid structure 216. In this example, structure 300 has two exemplary layers 302 (i.e., layer 0) and 304 (i.e., layer 1). For each frame of layered video coding structure 216, prediction logic 220 measures inter-layer frame prediction efficiency by comparing how prediction improves coding efficiency when inter-layer prediction is used to code the frame as compared to when inter-layer prediction is not used to code the frame. In this implementation, prediction logic 220 assumes that a frame positioned on a high layer (e.g., layer 1) of a layered video coded structure 300 uses a corresponding frame on a low layer (e.g., layer 0) of the structure 300 as a basis for predictive frame coding operations. In this example, inter-layer frame predictions are represented by respective ones of vertical arrows between the layers (e.g., vertical arrows 306), and intra-layer predictions are represented by arrows between respective frames (e.g., respective ones of arrows 308). In the example of FIG. 3, $I^1$ represents one frame of Layer 1 and $I^0$ denotes a corresponding frame of Layer 0.

When prediction logic 220 determines not to use inter-layer prediction, other frames at Layer 1 are used to generate a prediction frame $P_{NI}$ for $I^1$. Using a prediction frame from the same layer, the value coded by prediction module 212 is provided according to the following:

$$\text{Value Coded} = I^1 - P_{NI} \quad (1)$$

$P_{NI}$ indicates a prediction generated without inter-layer prediction, i.e. prediction used only a current layer. When prediction module 212 utilizes inter-layer prediction, a frame $I^1$ is coded based on a corresponding frame $P_I$ from a next lower layer (if any) in hybrid structure 216 layer hierarchy. In this latter scenario, prediction module 212 determines the coded value as follows:

$$\text{Value Coded} = I^1 - P_I \quad (2)$$

In this implementation, prediction module 212 measures efficiency of inter-layer prediction by reduction of mean squared errors (MSE) between the two predictions of equations (1) and (2), as given by Eq. (3):

$$\text{Efficiency} = MSE(I^1, P_{NI}) - MSE(I^1, P_I) \quad (3)$$

Correspondingly, prediction module 212 calculates the reduction or distortion-rate between the two values to be coded for a bit rate R as follows:

$$\text{Reduction in Distortion} = D_{I^1-P_{NI}}(R) D_{I^1-P_I}(R) \quad (4)$$

Prediction logic 220 evaluates a performance tradeoff to determine whether it is best to generate hybrid structure 216 with independent layer(s) (simulcast layer(s)) or all inter-layer frame prediction dependent layers. The trade-off is between the coding performance when multiple layers are required by an application, and the coding performance when an application requests only a single layer. In this implementation, this performance trade-off is evaluated using MSE reduction of inter-layer prediction and $R(I^0)$—i.e., the bit-rate for a layer 0—as follows:

$$\frac{MSE(I^1, P_{NI}) - MSE(I^1, P_I)}{R(I^0)} \geq \lambda \quad (5)$$

In view of (5), when the MSE reduction is less then a given threshold $\lambda$, coding module 212 will not use inter-layer prediction (the reduced prediction error is determined not worth the savings in the amount of data to be communicated to an application). On the other hand, when the MSE reduction is equal to or greater than a given threshold $\lambda$, coding module 212 implements inter-layer prediction to generate hybrid structure 216. In one implementation, the value of threshold $\lambda$ is set based on a relative prioritization and valuation of coding efficiency and transmission savings. In one implementation, this threshold is dynamic and based on periodically calculated data throughput conditions from computing device 202 over network 232 to an application (e.g., decoder 220) executing on remote computing 230.

In view of the above, and if an application requests/requires only one particular layer (e.g., Layer 1) for decoding operations, no inter-layer prediction of frames $I^1$ means that computing device 202 (e.g., via a bit-streaming application) only streams or otherwise provides bits for frames $I^0$ to the requesting application for decoding and presentation to the user. For purposes of exemplary illustration, such a requesting application is shown in FIG. 2, for example, as a video decoder of "other program modules" 214, or a decoder 228 executing on a remote computing device 230. As a result, for a bit rate R, a quantity of data to be communicated to the requesting application is reduced by $R(I^0)$. This is in contrast to a larger quantity of data that would otherwise have to be communicated to the application using full inter-layer prediction between frames of multiple layers. (A hybrid structure 216 that only represents inter-layer predictions that have been determined to be objectively efficient may represent full inter-layer prediction or less than full inter-layer prediction because certain ones of the inter-layer protections were determined to be inefficient).

For certain coding structures 300 (FIG. 3), prediction logic's (220) decision as to whether to use inter-layer predictions when generating the structure 300 are based on structure configuration, which determines efficiency for inter-layer prediction for different ones of the represented image frames. In the example of FIG. 3, a three-level hierarchical-B structure is used to represent all layers, although other structure types can also be used. In this example, frames 0 and 8 represent I-frames or P-frames, and remaining ones of the frames 1 through 7 represent B-frames. For B-frame i, if i %($2^j$)=0 but i %($2^{j+i}$)!=0, such as where i=(2k+1)·$2^j$ and k and j are integers, frames i−$2^j$ and i+$2^j$ will be the reference frames for frame I, wherein j represents the j-th hierarchical-B level.

For example, frame 1 (for both layers) frame 0 and frame 2 of the corresponding layer as references. Based on their distances to reference frames, B-frames of FIG. 3 are divided into three groups, $B_0=\{1,3,5,7\}$, $B_1=\{2,6\}$, and $B_2=\{4\}$. For a frame in group $B_j$, the distance to reference frames is $2^i$ frames. For frames that are short distances from their respective references frame(s), intra-frame predictions work well. However, for frames that are at longer distances to their reference frames, inter-layer predictions can significantly improve coding efficiency. Thus, for the exemplary hierarchical-B structure shown in FIG. 3, to determine whether to trade-off performance between using inter-layer prediction, wherein all layers represent a single cohesive unit, and not using inter-layer prediction, prediction logic 220 iteratively disables inter-layer predictions of group $B_0$, then group $B_1$, then group $B_2$. For purposes of exemplary illustration, FIG. 3 shows prediction relationship with all inter-layer predictions within group $B_0$ disabled (shown by the absence of vertical arrows between the layers).

An Exemplary Procedure

FIG. 4 shows an exemplary procedure 400 for implementing selective inter-layer prediction operations during layered video coding of an input video data sequence of frames, according to one embodiment. For purposes of exemplary illustration, the operations of procedure 400 are described with respect to the above described aspects of FIGS. 2-3. The leftmost numeral of a reference number indicates the figure in which the component or operation was/is first introduced. In one implementation, the operations of procedure 400 are implemented by coding module 212 (FIG. 2) with corresponding selective inter-layer prediction logic 220.

Operations of block 402 select a first frame for a higher layer of hybrid structure 216. Operations of block 404 measure efficiency of coding the frame using an inter-layer prediction based on a corresponding frame in an adjacent lower layer (lower relative to the higher layer) of hybrid structure 216. Operations of block 406 compare the measured efficiency with an efficiency threshold (e.g., lambda). The efficiency threshold is configured as an indication of whether data throughput criteria associated with communicating all layers of structure 216 to a decoding application is efficient enough or not. If the efficiency does not meet the efficiency threshold, procedure 400 continues at block 408, where in it is indicated that the inter-layer frame prediction will not be used to generate the code the frame. On the other hand, if operations of block 406 determine that the efficiency meets or exceeds the efficiency threshold, procedure 400 continues at block 410. Operations of block 410 specify that the inter-layer prediction should be incorporated to code the frame. Operations of block 412 determine if all the inter-layer frame predictions for coded frames of hybrid structure 216 have been evaluated for efficiency. If not, operations of block 414 identify a next frame in hybrid structure 216, and procedure 400 continues at block 404, as described above. Otherwise, if operations of block 412 determine that the inter-layer predictions for each of the frames have been evaluated for efficiency, procedure 400 advances to block 416, completing procedure 400.

CONCLUSION

Although selective inter-layer prediction in layered video coding has been described in language specific to structural features and/or methodological operations or actions, it is understood that the implementations defined in the appended claims are not necessarily limited to the specific features or actions described. For example, although prediction logic 220 of FIG. 2 has been described with implementing a frame-based selection scheme to determine efficiency of each frame's inter-layer frame-to-frame prediction relationship, in another implementation these efficiencies are evaluated on a group of pictures, each macro block in a frame, or some other data unit associated with the input video data sequence. Accordingly, the specific features and operations discussed above are disclosed as exemplary forms of implementing the following claimed subject matter.

What is claimed is:

1. A method at least partially implemented by a computing device, the method comprising:
   selectively employing only objectively efficient inter-layer predictions to generate a layered coded video structure from an input video data sequence; and
   responsive to receiving a request from an application for an entire set of layers of the layered coded video structure, communicating the entire set of layers of the layered coded video structure to the application for decoding and presentation to a user, the entire set of layers being free of objectively inefficient inter-layer predictions coded in the entire set of layers, wherein an inter-layer prediction is objectively inefficient if an error associated with coding a frame of a first layer of the layered coded video structure with the inter-layer prediction using one or more frames of a second layer is larger than an error associated with coding the frame of the first layer of the layered coded video structure with an intra-layer prediction using one or more frames of the first layer.

2. The method of claim 1, wherein the layered coded video structure is a hierarchical-B structure.

3. The method of claim 1, wherein selectively employing further comprises comparing how an inter-layer frame prediction improves frame coding efficiency as compared to not using the inter-layer frame prediction to code respective frames.

4. The method of claim 1, wherein selectively employing represents only objectively efficient inter-layer predictions, each inter-layer prediction being based on a first frame positioned on a higher layer of the layered coded video structure using a prediction based on a second frame positioned on a lower layer of the layered coded video structure.

5. The method of claim 1, wherein selectively employing comprises deciding whether to use the inter-layer predictions based on configuration of the layered coded video structure.

6. The method of claim 1, wherein selectively employing only efficient inter-layer predictions further comprises:
   for each frame of the layered coded video structure, measuring an inter-layer frame prediction efficiency;
   if the inter-layer frame prediction efficiency is determined to be objectively efficient, coding the frame with an inter-layer frame prediction; and
   if the inter-layer frame prediction efficiency is determined to be objectively inefficient, coding the frame independent of the inter-layer frame prediction.

7. The method of claim 1, wherein selectively employing only efficient inter-layer predictions further comprises:
   responsive to determining that an inter-layer frame prediction for a particular frame is inefficient, generating a prediction to code the frame from information associated with other frame(s) on a same layer as the frame; and
   responsive to determining that the inter-layer frame protection for the particular frame is efficient, generating a prediction to code the frame from information associated with one or more other frames on a next lower and adjacent layer to a layer associated with the frame.

8. The method of claim 1, wherein selectively employing only efficient inter-layer predictions further comprises:
   generating a first value based on a particular frame on a specific layer being coded using a first prediction based on information from other frames on the specific layer;
   calculating a second value based on the particular frame being coded using a second prediction based on information from frames on a different layer than the specific layer; and measuring efficiency of the first and second predictions in view of the first and second values to determine whether to code the particular frame using inter-layer frame prediction.

9. The method of claim 8, wherein measuring the efficiency further comprises:
determining a reduction of mean squared errors between the first and second values;
calculating reduction in distortion between the first and second values for a particular bit rate;
evaluating the reduction of mean squared errors in view of the reduction in distortion to determine whether a result is greater than or equal to a predetermined threshold value;
if the result is less than the predetermined threshold value, coding the particular frame independent of inter-layer frame prediction; and
if the result is greater than or equal to the predetermined threshold value, coding the particular frame using inter-layer frame prediction.

10. The method of claim 1, wherein the communicating further comprises:
if the request indicates that not all layers of the layered coded video structure are required, and if a layer corresponding to a requested bit rate was coded independent of any inter-layer frame predictions, communicating only the layer to the application, the layer being a simulcast layer.

11. The method of claim 1, wherein the communicating further comprises:
if the request indicates that all coded video layers are desired, communicating all layers of the layered coded video structure to the application, each layer representing only inter-layer frame predictions previously determined to be objectively efficient.

12. A tangible computer-readable data storage medium storing computer-program instructions executable by a processor, the computer-program instructions when executed by the processor for performing operations comprising:
generating a hybrid layered coded video structure from an input video data sequence;
for each frame of a layer of the layered coded video structure:
evaluating efficiency of coding the frame using intra-layer prediction as compared to coding the frame using intra-layer prediction, the evaluating comprising determining whether the inter-layer prediction is objectively efficient compared to the intra-layer prediction, wherein the inter-layer prediction is objectively efficient compared to the intra-layer prediction if an error associated with coding the frame of the layer of the layered coded video structure using the intra-layer prediction with one or more frames of the layer is greater than an error associated with coding the frame of the layer of the layered coded video structure using the inter-layer prediction with one or more frames of another layer, and
responsive to determining that the inter-layer prediction is objectively efficient compared to the intra-layer prediction, representing the frame of the layer of the layered coded video structure using the inter-layer prediction with the one or more frames of the another layer without coding the frame of the layer using the inter-layer prediction; and
responsive to receiving a request from an application for coded video data, communicating at least a subset of the layers to the application.

13. The computer-readable data storage medium of claim 12, wherein communicating at least the subset:
if a subset of all layers in the layered coded video structure is communicated to the application, a layer of the subset is a simulcast layer; and
if each layer of the layers is communicated to the application, multiple ones of the layers are based on inter-layer frame predictions that have been determined to be objectively efficient.

14. The computer-readable data storage medium of claim 12, wherein operations for evaluating the efficiency are based on a configuration of the layered coded video structure.

15. The computer-readable data storage medium of claim 12, wherein evaluating the efficiency, inter-layer prediction between frames is based on a first frame positioned on a higher layer of the layered coded video structure using a prediction based on a second frame positioned on a lower layer of the layered coded video structure.

16. The computer-readable data storage medium of claim 12, wherein evaluating the efficiency further comprises:
responsive to determining that inter-layer frame prediction for a particular frame is inefficient, generating a prediction to code the frame from information associated with other frame(s) on a same layer as the frame; and
responsive to determining that inter-layer frame protection for a particular frame is efficient, generating a prediction to code the frame from information associated with one or more other frames on a next lower and adjacent layer to a layer associated with the frame.

17. The computer-readable data storage medium of claim 12, wherein evaluating the efficiency further comprises:
generating a first value based on a particular frame on a specific layer being coded using a first prediction based on information from other frames on the specific layer;
calculating a second value based on the particular frame being coded using a second prediction based on information from frames on a different layer than the specific layer; and
measuring efficiency of the first and second predictions in view of the first and second values to determine whether to code the particular frame using inter-layer frame prediction.

18. A computing device comprising:
one or more processors; and
memory coupled to the one or more processors, the memory comprising computer-program instructions executable by the processor for performing operations comprising:
calculating a first error associated with coding a frame of a first layer of a video frame sequence when an intra-layer prediction from one or more frames of the first layer is used for the frame of the first layer;
calculating a second error associated with coding the frame of the first layer of the video frame sequence when an inter-layer prediction from one or more frames of a second layer that is different from the first layer is used for the frame of the first layer;
calculating an efficiency of the inter-layer prediction by comparing the second error with the first error;
determining whether the efficiency of the inter-layer prediction is greater than a predetermined threshold; and
in response to determining that the efficiency of the inter-layer prediction is greater than the predetermined threshold, coding the frame of the first layer of the video frame sequence using the inter-layer prediction from the one or more frames of the second layer.

* * * * *